United States Patent
Shukla et al.

(10) Patent No.: US 7,363,628 B2
(45) Date of Patent: Apr. 22, 2008

(54) DATA CENTRIC AND PROTOCOL AGNOSTIC WORKFLOWS FOR EXCHANGING DATA BETWEEN A WORKFLOW INSTANCE AND A WORKFLOW HOST

(75) Inventors: Dharma K. Shukla, Sammamish, WA (US); Mayank Mehta, Redmond, WA (US); Kumarswamy P. Valegerepura, Bellevue, WA (US); Akash J. Sagar, Redmond, WA (US); Israel Hilerio, Kenmore, WA (US); Dennis Pilarinos, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 11/167,472

(22) Filed: Jun. 27, 2005

(65) Prior Publication Data
US 2006/0294048 A1   Dec. 28, 2006

(51) Int. Cl.
*G06F 9/44* (2006.01)
(52) U.S. Cl. .......................... 719/313; 707/3
(58) Field of Classification Search ........ 719/310–313, 719/331, 332; 709/328; 707/2, 4, 10, 3; 717/101, 107, 120, 136; 705/1, 8, 9
See application file for complete search history.

(56) References Cited

U.S. PATENT DOCUMENTS

| | | | |
|---|---|---|---|
| 5,634,127 A * | 5/1997 | Cloud et al. ................. | 719/313 |
| 5,774,661 A | 6/1998 | Chatterjee et al. | |
| 6,225,998 B1 | 5/2001 | Okita et al. | |
| 6,253,369 B1 * | 6/2001 | Cloud et al. ................. | 717/136 |
| 6,397,192 B1 | 5/2002 | Notani et al. | |
| 6,567,783 B1 * | 5/2003 | Notani et al. ................. | 705/9 |
| 6,604,104 B1 * | 8/2003 | Smith ........................ | 707/10 |
| 6,768,986 B2 * | 7/2004 | Cras et al. .................... | 707/2 |
| 6,845,507 B2 * | 1/2005 | Kenton ....................... | 719/314 |
| 6,954,757 B2 * | 10/2005 | Zargham et al. ............ | 707/101 |
| 7,069,536 B2 | 6/2006 | Yaung | |
| 7,093,207 B1 * | 8/2006 | Liao et al. .................... | 716/1 |
| 7,181,440 B2 * | 2/2007 | Cras et al. .................... | 707/2 |
| 7,240,324 B2 | 7/2007 | Casati et al. | |
| 7,272,816 B2 | 9/2007 | Schulz et al. | |
| 2002/0032692 A1 | 3/2002 | Suzuki et al. | |
| 2002/0040312 A1 | 4/2002 | Dhar et al. | |
| 2002/0170035 A1 | 11/2002 | Casati et al. | |
| 2002/0184610 A1 | 12/2002 | Chong et al. | |

(Continued)

FOREIGN PATENT DOCUMENTS

DE     10215653 A1    11/2003

(Continued)

OTHER PUBLICATIONS

Maurer et al., "Merging Project planning and Web-Enabled Dynamic Workflow Technologies," IEEE Internet Computing, Jun. 2000, pp. 65-74, IEEE Service Center U.S.A.

(Continued)

*Primary Examiner*—Van H. Nguyen
(74) *Attorney, Agent, or Firm*—Senniger Powers LLP (57) ABSTRACT

Providing data bound workflow activities to model messaging between a workflow instance and a workflow host. The workflow author associates a data source with each data bound activity in a workflow without specifying details of the underlying messaging technology. The data bound activity in the workflow instance communicates with a data source service in the workflow host to exchange data.

20 Claims, 6 Drawing Sheets

U.S. PATENT DOCUMENTS

| | | | |
|---|---|---|---|
| 2003/0055668 A1 | 3/2003 | Saran et al. | |
| 2003/0084016 A1 | 5/2003 | Norgaard et al. | |
| 2003/0177046 A1* | 9/2003 | Socha-Leialoha | 705/7 |
| 2003/0217053 A1* | 11/2003 | Bachman et al. | 707/4 |
| 2003/0220707 A1 | 11/2003 | Budinger et al. | |
| 2004/0139426 A1* | 7/2004 | Wu | 717/120 |
| 2004/0148213 A1 | 7/2004 | Aziz et al. | |
| 2004/0162741 A1 | 8/2004 | Flaxer et al. | |
| 2005/0066002 A1* | 3/2005 | Teres et al. | 705/8 |
| 2005/0071209 A1* | 3/2005 | Tatavu et al. | 705/7 |
| 2005/0192963 A1* | 9/2005 | Tschiegg et al. | 707/9 |
| 2005/0267889 A1* | 12/2005 | Snyder et al. | 707/10 |
| 2006/0074734 A1* | 4/2006 | Shukla et al. | 705/8 |
| 2006/0206863 A1* | 9/2006 | Shenfield et al. | 717/107 |
| 2006/0241954 A1* | 10/2006 | Jeng et al. | 705/1 |
| 2006/0271927 A1 | 11/2006 | Morales et al. | |

FOREIGN PATENT DOCUMENTS

| | | |
|---|---|---|
| EP | 0953929 A2 | 11/1999 |
| WO | WO 00/54202 A2 | 9/2000 |

OTHER PUBLICATIONS

Marshack, "IBM's Flowmark Object-Oriented Workflow for Mission-Critical Applications," Workgroup Computing Report, vol. 17, No. 5, May 1, 1994, IBM Corporation, pp. 3-13.

Parasnis, "Session Code: DAT321—Data Systems—BizTalk Orchestration Engine Futures," Microsoft Professional Developers Conference 2003, Oct. 27, 2003, 13 pages, Microsoft Corporation, U.S.A.

"Notification of Transmittal of The International Search Report and the Written Opinion of the International Searching Authority in International Application No. PCT/US06/17766," dated Sep. 24, 2007, 9 pages.

* cited by examiner

DATA CENTRIC AND PROTOCOL AGNOSTIC WORKFLOWS FOR EXCHANGING DATA BETWEEN A WORKFLOW INSTANCE AND A WORKFLOW HOST

BACKGROUND

A workflow models a business process. Workflow applications developed using typical workflow technologies expect developers to think of data as messages that are being exchanged between two applications. This typical approach forces workflow developers to define communication exchanges and protocols that need to be followed to pass data between executing workflow instances and the application (e.g., workflow host) that instantiated the workflows. Many workflow developers, however, do not understand nuances of messaging or modeling message exchanges.

SUMMARY

Embodiments of the invention provide an abstraction for modeling workflow messaging. In particular, embodiments of the invention facilitate development of data centric workflow applications by providing native data constructs in a workflow framework. These constructs allow developers to model workflows as exchanges of data between the workflow instance and the workflow host while hiding messaging communications and protocols. Aspects of the invention enable a workflow to be agnostic to the underlying messaging technology.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
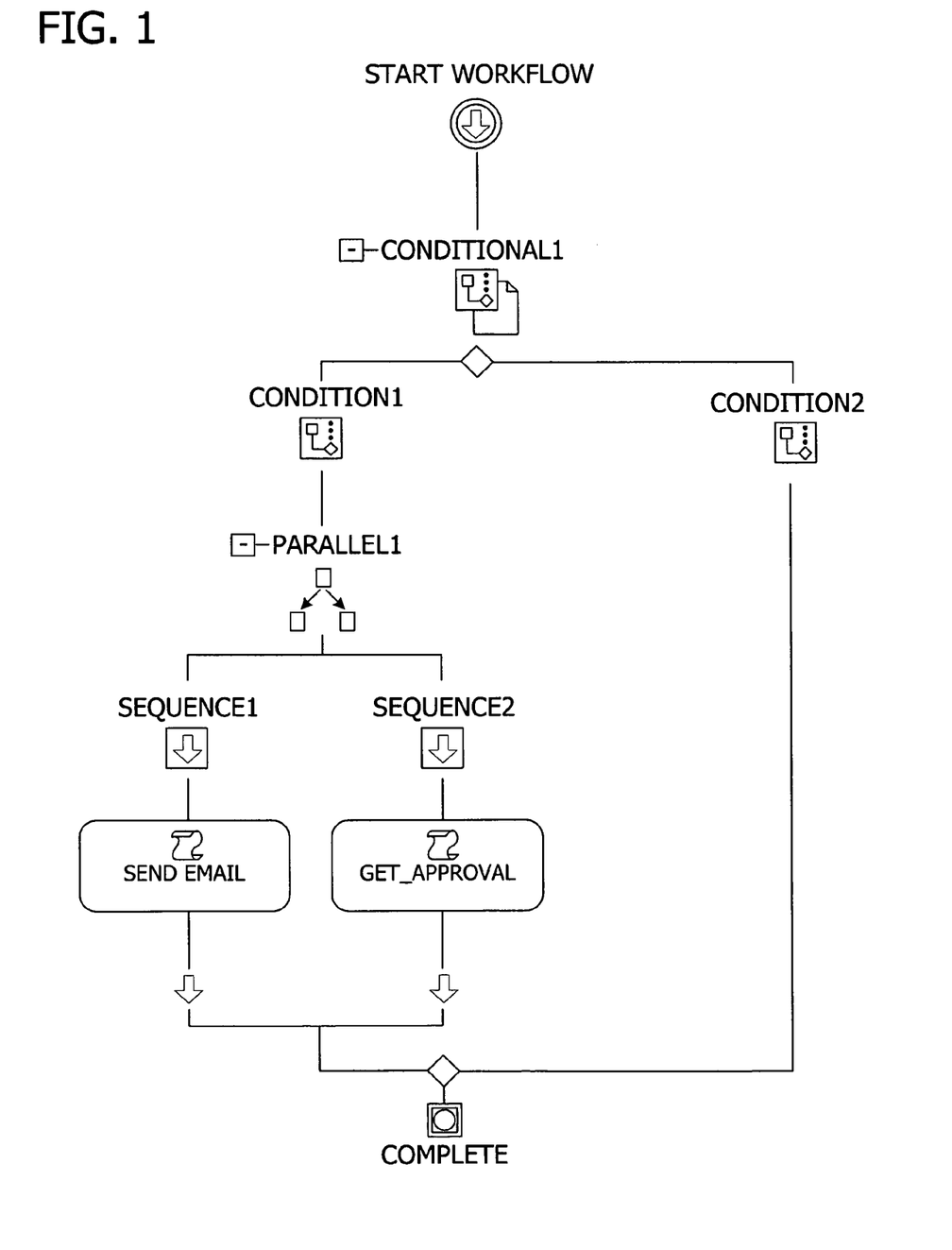
FIG. 1 is an exemplary workflow containing tasks and control flow composite activities.

FIG. 1 illustrates an exemplary workflow. Embodiments of the invention are operable with a workflow representing a process such as a business process. Business processes are dependent on ordered tasks, activities, or the like that result in predictable and repeatable outcomes. Including the operating procedures, institutional working knowledge, and information resources of an organization, business processes are designed to satisfy defined business objectives in an efficient and timely manner. In an efficient environment, the functional components of a process can be readily identified, adapted, and deployed to address ever-changing corporate requirements. The workflow is an end user's experience interacting with some of the, tasks in a business process. Tasks are modeled as activities, components, or the like, each representing a unit of work that is performed by a person or machine.

A workflow host instantiates a workflow to create a workflow instance. The workflow host and workflow instance exchange messages or otherwise communicate during execution of the workflow instance. In one embodiment, the messaging details of each of these exchanges must be modeled by the user during workflow authoring. Such an authoring process involves defining a local service interface (e.g., specifying a communications protocol) for every communication between the workflow instance and workflow host, implementing this interface in the workflow host, registering the interface as a communication service in the workflow environment, and generating strongly typed workflow activities that communicate with the interface implemented in the workflow host. Some workflows communicate using interfaces, methods (e.g., channels, ports).

Figure 5:
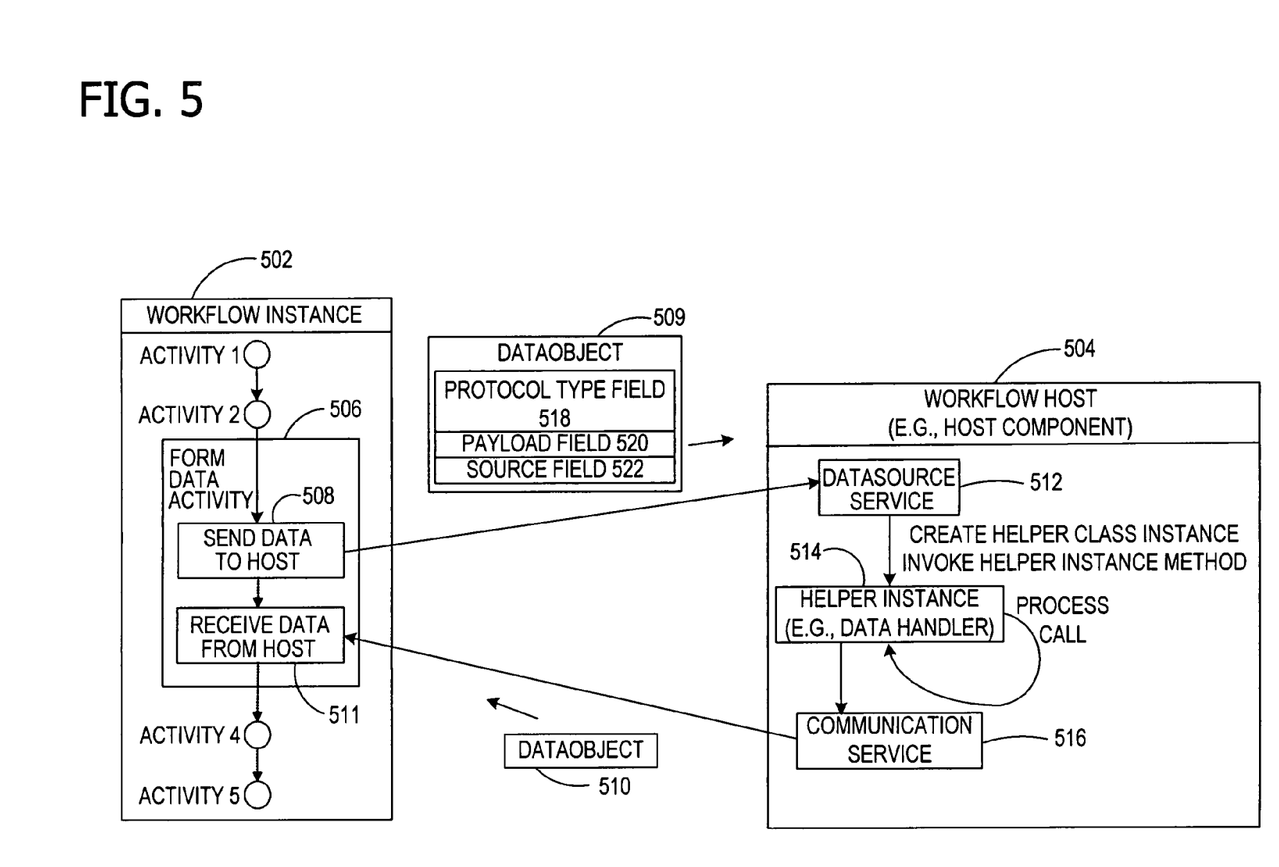
FIG. 5 is a block diagram illustrating interactions between an executing workflow instance and a workflow host.

Embodiments of the invention abstract and model communication between a workflow host and an executing workflow instance such as shown in FIG. 5 to provide an untyped way of communication with a workflow. The communication with the workflow instance is performed using a known channel and the data is a deciding factor for the communication with specific instances of the workflow. The abstraction (e.g., via data bound activities) enables a developer or other user to model communication in a workflow environment without modeling the messaging details. The user does not need to learn communication constructs or messaging concepts. The messaging details are handled automatically by an object communication service or other communication layer in the workflow environment. As such, the abstraction is agnostic to the underlying messaging technology. The data centric approach in aspects of the invention implements data exchange with any application or user.

In particular, the workflow host collects information from a user (e.g., through a form) or from an external system (e.g., using data access protocols) and passes the data back to the executing workflow instance for processing. In one embodiment, some of the forms technologies used by the workflow host programmer to obtain data from the user hide messaging concepts from the workflow host programmer. Aspects of the invention provide a data object associated with a particular data source definition (e.g., schema or type definition) to represent the data passed between the workflow host and the executing workflow instance. The, same data object may be manipulated by the workflow instance and the workflow host to reduce developer confusion and provide a data binding experience between workflow data objects and workflow hosts. In general, a data source (e.g., accessible by the workflow host) provides data for the data objects which consume the data or provide the data to a data consumer (e.g., a workflow activity). In one example, the interaction between the, workflow instance and the workflow host is not forms specific.

Figure 2:
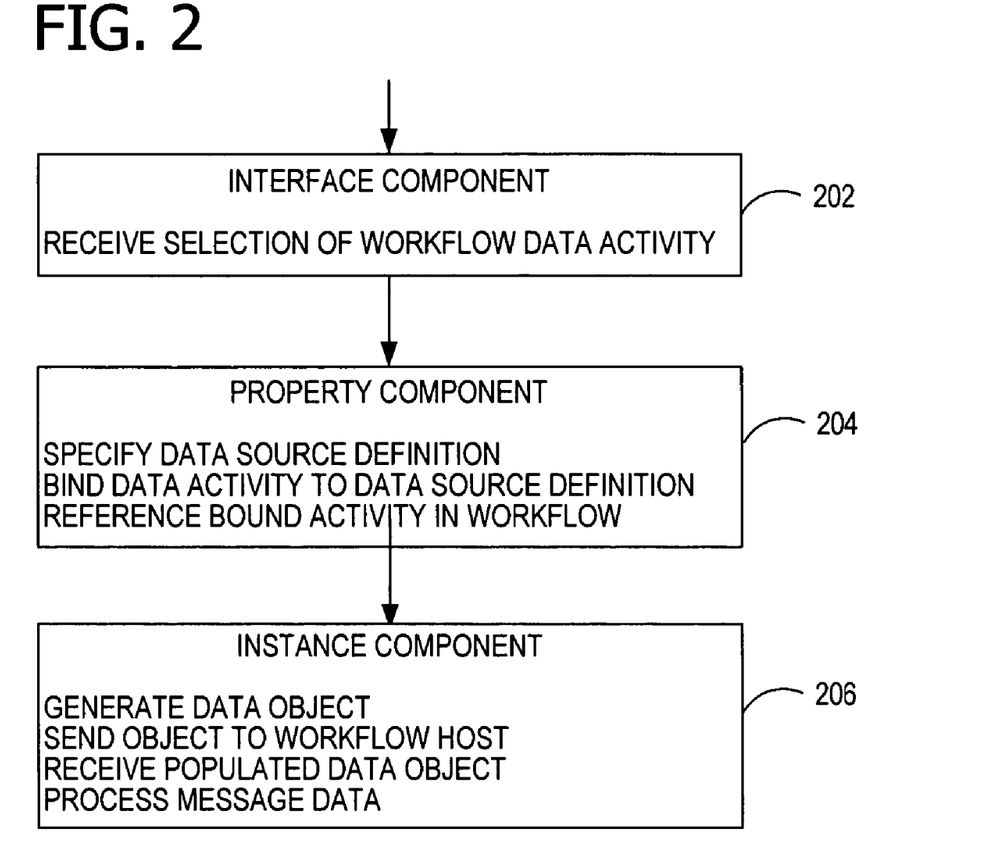
FIG. 2 is an exemplary flow chart illustrating operation of design time and run time aspects of the invention.

Referring next to FIG. 2, an exemplary flow chart illustrates operation of design time and run time aspects of the invention to implement protocol agnostic messaging.

Aspects of the invention model external data in terms of data sources and associate data sources to data bound activities. In general, the workflow developer defines a data source inside the workflow application, associates that data source to a data object (e.g., a container or a form), and receives modified data back via the same data object. Once this modified data is received by the workflow instance, decisions and other data bindings are possible.

The method illustrated in FIG. 2 implements protocol agnostic messaging between a workflow host and an executing workflow instance. In one embodiment, one or more computer-readable media have computer-executable instructions or components for implementing the method illustrated in FIG. 2. Exemplary computer-executable components include a user interface component 202 for receiving, from a user, a selection of a predefined workflow data activity for modeling a messaging operation between a workflow and a workflow host. In one embodiment, receiving the selection of the predefined workflow data activity includes receiving the selection via an application programming interface. To the user, the predefined data activity is agnostic to messaging protocols.

The components further include a property component 204 for specifying a data source definition, binding the selected data activity to the specified data source definition, and referencing the bound data activity as one of a plurality of activities in the workflow to implement messaging between the workflow and the workflow host. The data source definition defines a data object for storing message data to be communicated between an executing instance of the workflow and the workflow host. The workflow host instantiates the workflow instance. Specifying the data source definition may include, for example, receiving from the user an identifier corresponding to the data source definition or defining a schema for the message data. In one embodiment, the user defines a data object associated with the data source definition and programs or otherwise accesses the data object in the workflow.

The computer-executable components further include an instance component 206 that, during execution of the workflow instance, generates the data object per the specified data source definition and sends the generated data object to the workflow host. A host component (see FIG. 5) in the workflow host populates the data object with the message data and sends the populated data object to the instance component in the workflow instance. The instance component 206 receives the populated data object from the workflow host and processes the message data in the received, populated data object. In one embodiment, the message data corresponds to a request for data. In such an embodiment, the instance component 206 populates the data object with the requested data and sends the populated data object to the workflow host (e.g., to update a form).

Data bound activities encapsulate the underlying messaging machinery so that the workflow author and the workflow host developer do not need to define local service interfaces for the message interchange. In general, any implementation of a local service interface may be used to exchange data between the workflow and the host using this abstraction. In one example, a general purpose local service interface is defined to allow the exchange of data using this abstraction.

In one example, embodiments of the invention provide the following four data bound activities: UpdateData, SelectData, WaitForData, and WaitForQuery. The UpdateData activity allows the workflow to update the external data. The SelectData activity allows the workflow to query for the external data. The WaitForData activity models a wait point in a workflow for external data. The WaitForQuery activity models a wait point in the workflow corresponding to a data query request. In one embodiment, the external data may exist in a database accessible by the workflow host, or be data obtained from a form. For example, when connecting to a form, the data is stored in the workflow and the UpdateData activity informs the form that the data has been modified.

The following table describes the properties of each of these data activities. The activation property in the context properties maps to the activation property on the data bound activities WaitForData and WaitForQuery. If either of these activities have the activation set to true, the context properties include the activation property with true as the value.

TABLE 1

Properties of Exemplary Data Bound Activities.

| Activity\Property | Data Source | Data Object | Activation |
|---|---|---|---|
| UpdateData | The data source provides the functionality to update the data in the host. | This is the data that is sent to the host. | - NA - |
| SelectData | The data source provides the functionality to query the host for data. | This is the data that is queried from the host. | - NA - |
| WaitForData | It is used to correlate the incoming messages for this activity. | This is the incoming data from the host. | When set to true, the incoming data will activate the workflow |
| WaitForQuery | It is used to correlate the incoming messages for this activity. | This is the incoming query result. | When set to true, the incoming query request will activate the workflow |

A data source represents an external data schema. For example, a data source may be a local container for the data that is transmitted to/from forms and workflows. The data source defines the format and/or structure of the data stored therein. One embodiment of the invention provides extensible markup language schema definition (XSD) and common language runtime (CLR) type based data sources. Any format that is used to describe the structure of an object or data, however, may be used to define a data source. For example, an interface definition language (IDL) or web services description language (WSDL) may be used to define data sources. The following table describes the properties of an exemplary type/object data source that uses type (e.g., class) definitions as definitions to auto-generate data objects.

TABLE 2

Exemplary Object Data Source.

| Property | Description |
|---|---|
| Name | Specify the name of the data source |
| DataHandlerTypeName | Specify the type of the data handler used to handle UpdateData and SelectData outgoing calls of the workflow. |
| DataObjectTypeName | Specify the type of the data object. |

TABLE 2-continued

Exemplary Object Data Source.

| Property | Description |
| --- | --- |
| Properties | Specify the properties on the DataObject that will be used to correlate workflow instances. |

The following table describes the properties of an exemplary XSD/XML data source that uses XSD definition as schema definitions to auto-generate data objects.

TABLE 3

Exemplary XSD Data Source.

| Property | Description |
| --- | --- |
| Name | Specify the name of the data source |
| DataHandlerTypeName | Specify the type of the data handler used to handle UpdateData and SelectData outgoing calls of the workflow |
| ProxyType | Specify the proxy type generated from the XSD file |
| Properties | Specify the XPath properties on the |

TABLE 3-continued

Exemplary XSD Data Source.

| Property | Description |
| --- | --- |
|  | XSD schema |

Figure 3:
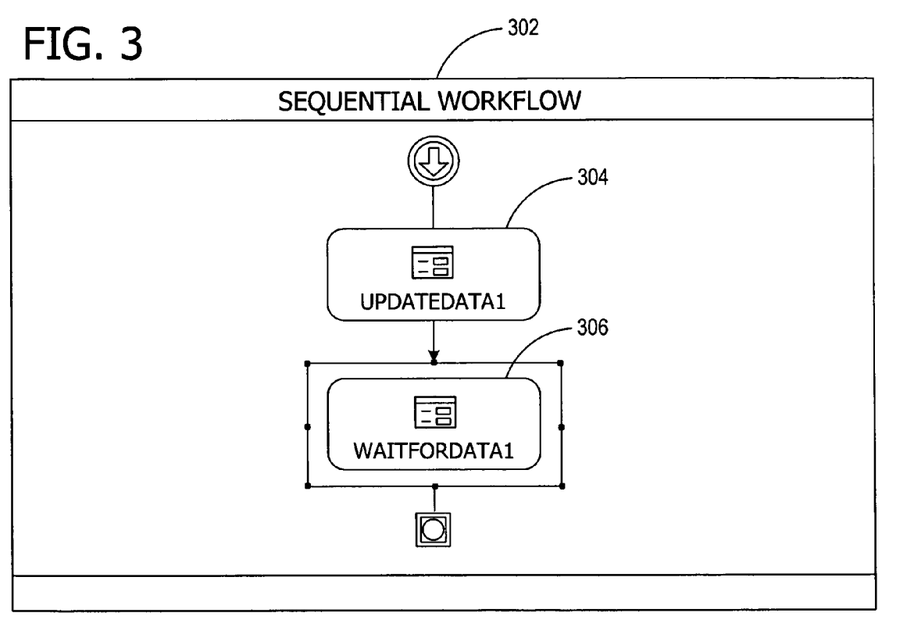
FIG. 3 is a block diagram illustrating a sequential workflow having two data activities.

Referring next to FIG. 3, a block diagram illustrates a sequential workflow 302 having two data activities. In this example, a workflow author designs the workflow 302 to upload data via the updateData1 activity 304 and wait for a data changed event from a workflow host via the waitForData1 activity 306. The workflow developer experience includes configuring a data source and configuring these data bound activities 304, 306.

A data source may be configured via a user interface or programmatically via an application programming interface. In one example, an instance of ObjectDataSource is created and added to a DataSources collection in a DataContext activity. The properties of the ObjectDataSource (shown in the table below) may then be configured.

TABLE 4

Properties of an ObjectDataSource.

| Property | Value | Description |
| --- | --- | --- |
| Name | "orange" | Specify the name of the data source |
| DataObjectTypeName | "FormTest.Task" [SerializableAttribute( )] public class Task {     public string ID {         get {             return this.id;         }         set {             this.id = value;         }     }     public string Assignee {         get{             return this.assignee;         }         set {             this.assignee = value;         }     } } | This type may be defined by the user and may be contained on a separate assembly |
| DataHandlerTypeName | "FormTest.BusinessHelper" public class BusinessHelper : IDataHandler {     public object SelectData(object message, DataSourceInfo dataSource)     {         // User Code         return message;     }     public void | This type may be defined by the user and may be contained on a separate assembly. |

TABLE 4-continued

Properties of an ObjectDataSource.

| Property | Value | Description |
|---|---|---|
| | UpdateData (object message, DataSourceInfo dataSource) { // User Code } } | |
| Properties | "ID" | Specify the properties on the DataObject class that is used to correlate workflow instances. |

Figure 4:
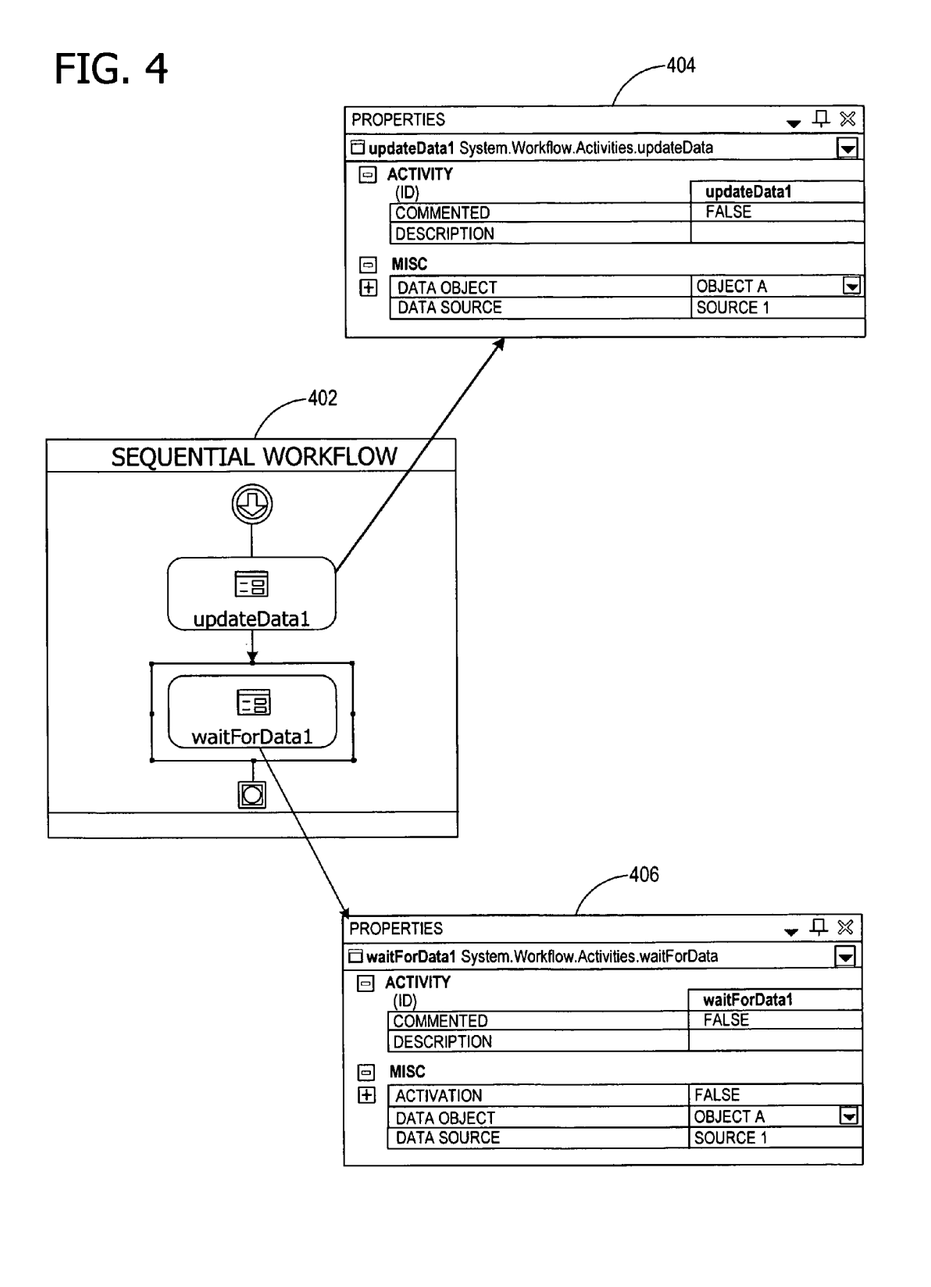
FIG. 4 is a block diagram illustrating the sequential workflow of FIG. 3 and properties and property values associated with each of the data activities in the sequential workflow.

The developer adds two data bound activities (e.g., UpdateData and WaitForData) to the workflow. The developer configures the properties of these data bound activities via a user interface or programmatically via an application programming interface. For example, FIG. 4 illustrates a sequential workflow 402 such as the sequential workflow 302 in FIG. 3 including properties and property values associated with each of the data activities in the sequential workflow 402. Table 5 describes the properties 404 of the UpdateData data bound activity shown in FIG. 4. Table 6 describes the properties 406 of the WaitForData data bound activity shown in FIG. 4.

TABLE 5

Properties of the UpdateData Data Bound Activity.

| Property | Value | Description |
|---|---|---|
| DataSource | "Source 1" | Specify the data source |
| DataObject | "Object A" | Bind to the data object variable in the DataContext class |

TABLE 6

Properties of the WaitForData Data Bound Activity.

| Property | Value | Description |
|---|---|---|
| DataSource | "Source 1" | Specify the data source |
| DataObject | "Object A" | Bind to the data object variable in the DataContext class |

The workflow host developer experience includes writing code that works with the data source service to submit events (e.g., data change events) to the executing workflow instance. For example, the data source service provides methods for raising DataChanged and DataQuery events to the workflow. The workflow host developer does not need to implement any object communication service (OCS) interface or other local service interface. The following workflow host code excerpt fires a DataChanged event to the workflow using the data source service.

// Get the DataSourceService from the ObjectConnection-Service
Dictionary<string, object>properties=new Dictionary<string,object>( );
properties.Add("InstanceId", instance.InstanceId);
properties.Add("WorkflowType", typeof(FormTest.Workflow1));
properties.Add("DataSource", "Workflow1.orange");
FormTest.Task t=new FormTest.Task("5");
service.RaiseDatacChanged(properties, t);

Referring next to FIG. 5, a block diagram illustrates interactions between an executing workflow instance 502 and a workflow host 504. In general, the workflow host 504 receives events from a form or an external application (not shown) and processes and publishes data objects 510 to the workflow instance 502 for processing. In a document scenario, the workflow host 504 retrieves the type of the data object in the payload of a data object 509 from the workflow instance 502, identifies the form associated with that type, serializes the data object 509 into extensible markup language (XML), and stores the XML inside a document repository (not shown).

In the example of FIG. 5, a computer-implemented system provides protocol agnostic messaging in a workflow environment. The system includes the workflow 502 host for instantiating a workflow to create a workflow instance for execution. The system also includes one or more predefined data activities such as the form data activity 506 for use in the workflow. The form data activity 506 includes a "send data to host" activity 508 and a "receive data from host" activity 511. Each of the predefined data activities 508, 511 models a messaging operation between the workflow instance 502 and the workflow host 504. The predefined data activity 508 generates the data object 509 during execution of the workflow instance to store message data. The data object 509 is communicated from the workflow instance 502 to the workflow host 504. A data source definition defines a data structure associated with the data object 509. The system further includes a data source service 512 associated with the workflow host 504 for populating the data object 509 with the message data and communicating the populated data object as data object 510 to the workflow instance 502 for processing.

The system of FIG. 5 also includes a computer-readable medium (not shown) storing a data structure representing the data object 509. The data structure includes a protocol type field 518, a payload field 520, and a source field 522. The protocol type field 518 stores a value identifying a protocol for use in communication between the executing workflow instance 502 and the workflow host 504. The payload field 520 stores the message data. The source field 522 stores a value identifying the data source definition for the data object 509. The data source definition identifies a protocol for communication between the workflow instance 502 and the workflow host 504.

The data source service 512 in the workflow host transfers the payload of the message in a data object to an application in the workflow host by instantiating a helper class in the host processing space at 514. The workflow host developer configures these helper classes in the workflow definition when defining data sources. Once the helper class instance is created or invoked, the host 504 has control over the payload of the message via the instantiated helper class (e.g., data handler). Any clients managed by the host 504 are capable of receiving this data and updating its content. The helper classes include a plurality of data handlers to process the data object. A communication service 516 in the host 504 communicates the, populated data object 510 to the workflow instance 502.

An exemplary data source service 512 provided by the workflow host 504 includes the methods shown below. The first method raises a DataChanged event to the workflow and the second method raises a DataQueried event to the workflow and receives the query results.

void                RaiseDataChanged(IDictionary<string, object>contextProperties, object msg)

object              RaiseDataQueried(IDictionary<string, object>contextProperties, object msg)

The argument 'IDictionary<string, object>contextProperties' contains the context properties such as workflow instance identifier, workflow type, qualified name of the data source, and activation value (e.g., if the message is an activation message). The argument 'object message' represents the data object 510 or message to be sent to the workflow.

In one embodiment, the following operations are performed during runtime via messages between the executing workflow instance 502 and the workflow host 504. An activation event is received by a workflow definition and the workflow instance 502 is created. The workflow instance 502 is initialized with the information on the activation event. A data bound activity (e.g., a form data activity or a data activity) such as activity 506 is encountered in the executing workflow instance 502. The activity 508 contained by the data bound activity 506 container generates and sends the data object 509 to the workflow host 504. The data source service 512 associated with the workflow host 504 receives the data object 509 from the workflow instance 502. The data source service 512 invokes a data handler on the workflow host 504 to process the received data object 509. In the workflow instance 502, another activity 511 (e.g., "Receive Data from Host") waits until a query request or a submit event is received from the workflow host 504. If a query request is received by the activity 511 in the workflow instance 502, the request is processed and the results are sent to the workflow host 504 using an "Upload Data to Host" activity (not shown). If a submit event is received by the activity 511 in the workflow instance 502, the event is processed and the activity 506 is marked as completed. The workflow instance 502 continues to process all of its data activities until the workflow application finishes.

Embodiments of the invention support the workflow operations described herein for any schematized or object-based forms technology as well as any third party external applications.

Exemplary Operating Environment

Figure 6:
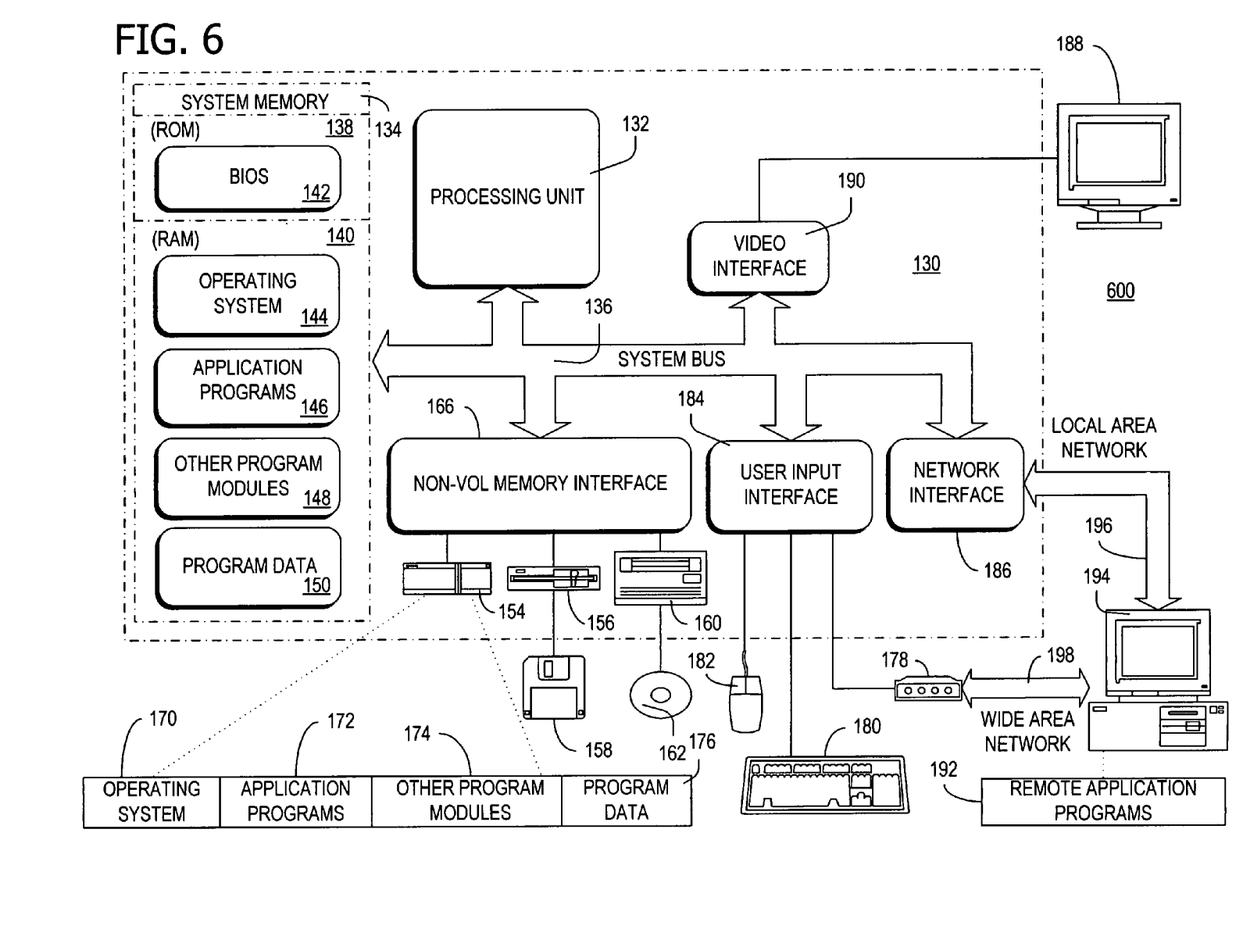
FIG. 6 is a block diagram illustrating one example of a suitable computing system environment in which aspects of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage-media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are, familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs. 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein include these and other various types of computer-readable storage media when such media contain instructions or programs for implementing the steps described below in conjunction with a microprocessor or other data processor. Embodiments of the invention also include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed, by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs), such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention. Hardware, software, firmware, computer-executable components, and/or computer-executable instructions constitute means for implementing protocol agnostic messaging in the workflow.

The following examples further illustrate embodiments of the invention. In one scenario, a developer is interested in developing a workflow application that requires users to enter information using some forms technology (e.g., web forms). The forms have been previously defined and have their own schema definitions. The developer wishes to model the form interactions and data elements as steps inside the workflow application. This interaction between the form and the workflow is expected to take place without having to rewrite the forms. To achieve this, the developer uses a workflow step or building block called a form data activity and adds it to the workflow definition. The developer configures the data source associated with this object to point to the form schema definition (e.g., schema definitions could be expressed as XML schemas). This association auto-generates a mapping type from where an object instance is created inside the workflow during execution of the workflow. This object instance is manipulated by the developer to send and retrieve data to and from the form, respectively. At runtime, this object instance is serialized and de-serialized by the workflow host and information is injected into and retrieved from the form. This occurs without modifying the form.

In another scenario, a developer is interested in developing a workflow application that depends on data from an external legacy system to execute. In this example, the external system only provides a database interface to access its data and has no web service interfaces. The developer wishes to model the exchange of data between the workflow and the external legacy systems. Each time a workflow step is executed that requires data from the legacy system, the workflow step waits for the information to be updated by the legacy system. To achieve this, the developer uses a workflow step or building block called a data activity and adds it to the workflow definition. The developer configures the data source associated with this object to point to the object data source. During this configuration step, the developer defines the type library and the type (e.g., class) to exchange data between the external system and the workflow instance. This association creates an object instance of the selected type inside the workflow definition during execution of the workflow instance. This object instance will be manipulated by the developer to send and retrieve data to and from the legacy system, respectively. At runtime, this object is passed to and queried by the external system via translation code provided by the workflow host. In this example, the workflow host facilitates the data exchange between the external legacy system and the workflow instance without introducing any new types.

In an example in which a workflow models a document review process, an interface for reviewing a document (e.g., IDocumentReviewInterface) is shown below.

```
public delegate void OnReviewStartedHandler(object o);
public delegate void OnParticipantsAddedHandler(object o);
public interface IDocumentReviewInterface
{
    event OnReviewStartedHandler OnReviewStarted;
    event OnParticipantsAddedHandler OnParticipantsAdded;
    void ReviewCompleted(object o);
}
    In this example, the object "o" corresponds to
    an instance of a type
that will capture a flat list of arguments such as shown below.
    public class DocumentReviewInfo
    {
        public DocumentInfo documentInfo;
        public Hashtable ReviewResults;
    }
```

The DocumentReviewInfo type describes the shape/schema of the data being communicated. This type is authored by the workflow author and the workflow host developer does not need to implement anything in this example.

Aspects of the invention hide the messaging machinery from the workflow author by providing a standard local service interface with data bound activities that know how to communicate with the standard interface. The workflow author describes the schema of the data being exchanged (e.g., converts the flat list of arguments of a method of a local service interface into a class definition such as in the DocumentReviewInfo class described herein). In one example, the standard local service interface is called DataSourceService and shown below. The IDataSourceService shown below is merely exemplary, and in some embodiments, the IDataSourceService is not exposed. Rather, the methods RaiseDataChanged and RaiseDataQueried of DataSourceService are exposed.

```
public delegate void DataChangedEventHandler(IDictionary<string, object>properties, object proxy);
public delegate void DataQueriedEventHandler(IDictionary<string, object>properties, object proxy);
public delegate void DataFetchedEventHandler(IDictionary<string, object>properties, object proxy);
[DataExchangeService]
[CorrelationProvider(typeof(CorrelationTokenProvider))]
public interface IDataSourceService
{
    void UploadData(DataSource ds, object proxy);
    void FetchData(DataSource ds, object proxy);
    event DataFetchedEventHandler DataFetched;
    event DataChangedEventHandler DataChanged;
    event DataQueriedEventHandler DataQueried;
    void PostDataQueryReply(DataSource ds, object proxy);
}
```

An exemplary implementation called DataSourceService is shown below.

```
public class DataSourceService : IDataSourceService
{
    #region IDataSourceService Members
    void IDataSourceService.UploadData(DataSource ds, object
    proxy){}
    void IDataSourceService.FetchData(DataSource ds, object
    proxy){}
    event DataFetchedEventHandler IDataSourceService.DataFetched
    { add { } remove { } }
    event DataChangedEventHandler
    IDataSourceService.DataChanged
    { add { } remove { } }
    event DataQueriedEventHandler
    IDataSourceService.DataQueried
    { add { } remove { } }
    void IDataSourceService.PostDataQueryReply(DataSource ds,
    object
proxy){}
    #endregion
    public void RaiseDataChanged(IDictionary<string, object>
properties,object msg) {}
    public object RaiseDataQueried(IDictionary<string,
    object> properties,
object msg) {}
}
```

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of embodiments of the invention.

When introducing elements of embodiments of the invention, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of embodiments of the invention, it is intended that all matter contained in the above description and shown in the accompanying drawings shall be interpreted as illustrative and not in a limiting sense.

What is claimed is:

1. A method of implementing protocol agnostic messaging between a workflow host application and an executing workflow instance while hiding messaging communications and protocols from a user, said method comprising: receiving, from the user, a selection of a predefined workflow data activity for modeling a messaging operation between the executing workflow instance and the workflow host application, said selection not specifying a particular message protocol; wherein the predefined workflow data activity includes at least one or more activities in a set, the set comprising: an update data activity for communicating the data from the executing workflow instance to the workflow host, a select data activity for enabling the executing workflow instance to query for the data from the workflow host, a wait-for-data activity to enable the executing workflow instance to wait to receive the data from the workflow host, and a wait-for-query data activity to enable the executing workflow host;

specifying, by a computing device, a data source definition, said specified data source definition defining a data object for storing message data to be communicated between an executing instance of the workflow and the workflow host application, said workflow host application instantiating the workflow instance;

binding, by the computing device, the selected data activity to the specified data source definition;

referencing, by the computing device, the bound data activity as one of a plurality of activities in the workflow host application to implement messaging between the workflow instance and the workflow host application, wherein the bound data activity does not specify the particular message protocol;

during execution of the workflow instance:

generating the data object per the specified data source definition;

sending the generated data object to the workflow host application, wherein the workflow host application populates the data object with the message data;

receiving the populated data object from the workflow host application; and processing the message data in the received, populated data object; and wherein the workflow host application receives the generated data object, populates the received data object with the message data, and sends the populated data object to the workflow instance.

2. The method of claim 1, wherein specifying the data source definition comprises receiving, from the user, an identifier corresponding to the data source definition.

3. The method of claim 1, wherein receiving the selection of the predefined workflow data activity comprises receiving the selection via an application programming interface.

4. The method of claim 1, wherein the message data corresponds to a request for data, and further comprising populating the data object with the requested data and sending the populated data object to the workflow host application.

5. The method of claim 4, wherein the message data corresponds to a request for data, and further comprising populating the data object with the requested data and sending the populated data object to the workflow host.

6. The method of claim 1, wherein one or more computer-readable storage media have computer-executable instructions for performing the method recited in claim 1.

7. The method of claim 4, wherein sending comprises sending the populated data object to the workflow host application to update a form.

8. A computer-implemented system for protocol agnostic messaging in a workflow environment while hiding messaging communications and protocols from a user, said computer-implemented system comprising:

a processor having configured to execute computer-executable instructions embodied in one or more computer storage media:

a workflow host application for instantiating a workflow to create a workflow instance for execution;

one or more predefined data activities for use in the workflow, each of the predefined data activities modeling a messaging operation between the workflow instance and the workflow host application, each of the predefined data activities generating a data object during execution of the workflow instance to store message data, said data object being communicated from the workflow instance to the workflow host application, wherein the one or more predefined data activities do not specify a messaging protocol; wherein the one or more predefined data activities include at least one or more activities in a set, the set comprising: an update data activity for communicating the data from the executing workflow instance to the workflow host, a select data activity for enabling the executing workflow instance to query for the data from the workflow host, a wait-for-data activity to enable the executing workflow instance to wait to receive the data from the workflow host, and a wait-for-query data activity to enable the executing workflow instance to wait to receive the data corresponding to a query request from the workflow host;

a property component for: specifying a data source service associated with the workflow host application for populating the data object with the message data and communicating the populated data object to the workflow instance for processing by the processor; binding the selected data activity to the specified data source definition; and referencing the bound data activity as one of a plurality of activities in the workflow host application to implement messaging between the workflow instance and the workflow host application, wherein the bound data activity does not specify the particular message protocol;

wherein, during execution of the workflow instance, the processor is further configured to perform the following operations:

generating the data object per the specified data source definition;

sending the generated data object to the workflow host application, wherein the workflow host application populates the data object with the message data;

receiving the populated data object from the workflow host application; and processing the message data in the received, populated data object;

wherein the workflow host application receives the generated data object, populates the received data object with the message data, and sends the populated data object to the workflow instance.

9. The computer-implemented system of claim 8, wherein the data source definition comprises defining a data structure associated with the data object.

10. The computer-implemented system of claim 9, further comprising a computer-readable storage medium having stored thereon the data structure representing the data object, the data structure comprising:

a protocol type field for storing a value identifying a protocol for use in communication between the executing workflow instance and the workflow host application;

a payload field for storing the message data; and a source field for storing a value identifying the data source definition for the data object.

11. The computer-implemented system of claim 8, further comprising means for implementing protocol agnostic messaging in the workflow.

12. The computer-implemented system of claim 8, further comprising a plurality of data handlers accessible by the data source service to process the generated data object, and wherein the data source service performs the following:

receiving the generated data object from the executing workflow instance, said generated data object having a payload associated therewith;

invoking one of the plurality of data handlers to process the received data object;

receiving data from a data source;

populating the payload with the received data as the message data to create a published data object;

sending the published data object to the executing workflow instance.

13. The computer-implemented system of claim 8, further comprising an application programming interface enabling a user to create the workflow.

14. The system of claim 8, wherein the update data activity communicates the data from the executing workflow instance to the workflow host to update a form.

15. A computer-readable storage medium having computer-executable components for messaging between a workflow instance and a workflow host while hiding messaging communications and protocols from a user, said components comprising:

a user interface component, said user interface component receives, from the user, a selection of a predefined workflow data activity to model a messaging operation between said workflow instance and a workflow host application, said selection not specifying a particular message protocol; wherein the predefined workflow data activity includes at least one or more activities in a set, the set comprising: an update data activity for communicating the data from the executing workflow instance to the workflow host, a select data activity for enabling the executing workflow instance to query for the data from the workflow host, a wait-for-data activity to enable the executing workflow instance to wait to receive the data from the workflow host, and a wait-for-query data activity to enable the executing workflow instance to wait to receive the data corresponding to a query request from the workflow host;

a property component, said property component specifies a data source definition, said specified data source definition defining a data object to store message data to be communicated between the workflow instance and the workflow host application, said workflow host application instantiating the workflow instance, said property component binding the data activity selected via the user interface component to the specified data source definition, said user interface component further referencing the bound data activity as one of a plurality of activities in the workflow host to implement messaging between the workflow instance and the workflow host application, wherein the bound data activity does not specify the particular message protocol;

an instance component, said instance component:

generates, during execution of the workflow instance, the data object per the specified data source definition;

sends the generated data object to the workflow host application, wherein the workflow host populates the data object with message data;

receives the populated data object from the workflow host application; and processes the message data in the received, populated data object; and a host component in the workflow host, said host component receives the generated data object from the instance component, populates the received data object with the message data, and sends the populated data object to the workflow instance.

16. The computer-readable storage medium of claim 15, wherein the instance component further populates the data object with data and sends the populated data object to the workflow host application to update a form.

17. The computer-readable storage medium of claim 15, wherein the data source definition defines a schema for the message data.

18. The computer-readable storage medium of claim 15, wherein the instance component further displays the message data to the user.

19. The computer-readable storage medium of claim 15, wherein the data source definition identifies a protocol for communication between the workflow instance and the workflow host application.

20. The computer-readable storage medium of 15, further comprising a plurality of data handlers accessible by the data source definition to process the generated data object, and wherein the data source definition performs the following:

receiving the generated data object from the executing workflow instance, said generated data object having a payload associated therewith;

invoking one of the plurality of data handlers to process the received data object;

receiving data from a data source;

populating the payload with the received data as the message data to create a published data object;

sending the published data object to the executing workflow instance.

* * * * *